G. F. GREEN.
ELECTRO MAGNETIC DENTAL PLUGGER.

No. 171,123. Patented Dec. 14, 1875.

Witnesses.

Inventor.

UNITED STATES PATENT OFFICE.

GEORGE F. GREEN, OF KALAMAZOO, MICHIGAN, ASSIGNOR TO SAMUEL S. WHITE, OF PHILADELPHIA, PENNSYLVANIA.

IMPROVEMENT IN ELECTRO-MAGNETIC DENTAL PLUGGERS.

Specification forming part of Letters Patent No. 171,123, dated December 14, 1875; application filed August 5, 1873.

*To all whom it may concern:*

Be it known that I, GEORGE F. GREEN, of Kalamazoo, Michigan, have invented certain new and useful Improvements in Electro-Magnetic Dental Pluggers, of which the following is a specification:

My invention relates to that class of dental implements in which electro-magnetism is employed as a motor. In such instruments it is essential to have a motive power sufficient to do the work required, and yet to have the instrument sufficiently light and compact to be easily handled. I have attained this desideratum by the means shown in the accompanying drawings, in which—

Figure 1:
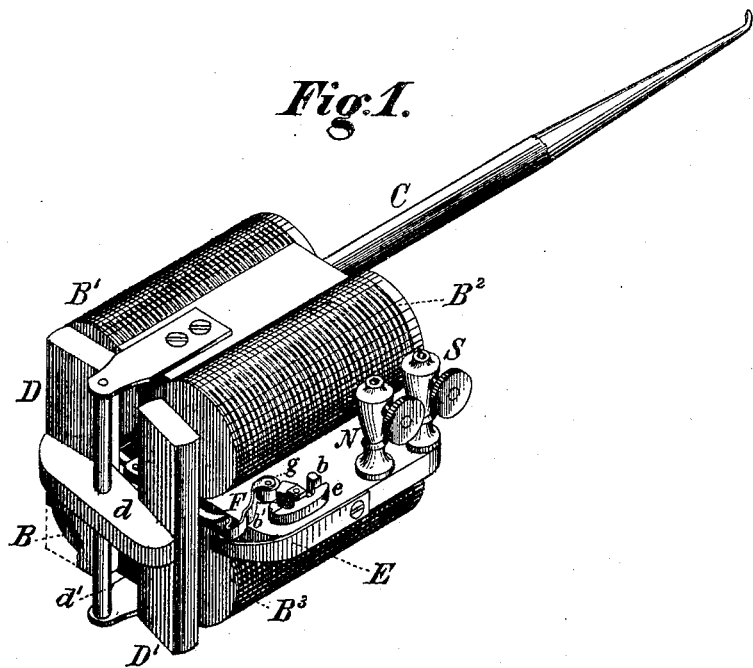
Figure 2:
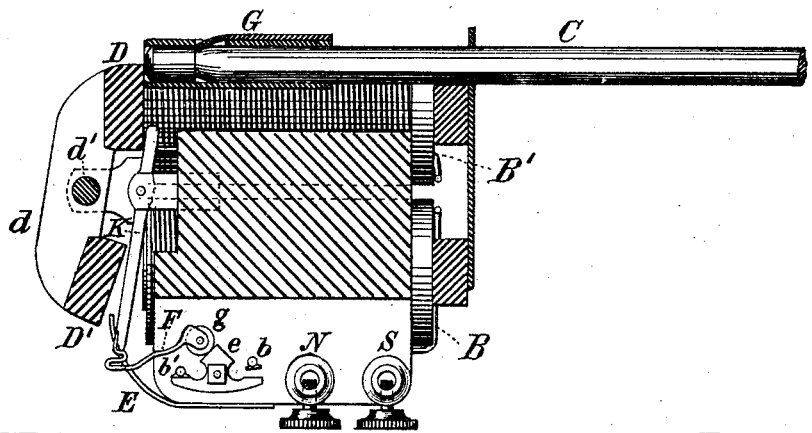

Figure 1 represents a view in perspective, and Fig. 2 a longitudinal section.

I combine two electro-magnets, composed of four coils, B $B^1$ $B^2$ $B^3$, two coils (constituting a magnet) being placed side by side, and one magnet above the other, the respective coils being properly insulated from each other. An armature, D D', for each magnet is held in place by a bar, $d$, across them, and a shaft, $d'$, through this cross-bar turns with the oscillation of the armatures in bearings supported on the insulated portions of the nest of coils. As the electric circuit shifts from one magnet to the other the armatures are, in turn, drawn to and from the faces of their respective coils. The battery-wires connect with the binding-posts N S in the well-understood way. Between the coils of the magnet B $B^1$ I locate the circuit-breaker, consisting of the trefoil-shaped block $e$ and wheel $g$, which wheel is mounted upon the bent flexible end of a rocking arm, $k$, supported in the insulated center of the nest of coils, and the lower end of this arm is extended below its pivoted point, so as to be acted upon by the lower armature D' as the upper part is acted upon by the upper armature D. The ends of the coil-wires $b$ $b'$ project on either side of this wheel $g$, and the block $e$ is pivoted, so that one or the other of its points shall, when depressed, bear upon one or the other of the wires, while its third point depends over the wheel $g$, so that when the arm $k$ vibrates upon its pivot it moves the wheel $g$, and through this wheel, acting on the block $e$ adjacent, shifts the circuit from one magnet to the other. The movements of this wheel $g$ are effected as follows: The armature D, being attracted toward the magnet B $B^1$, forces in the upper end of the rocking arm, and pushes the wheel $g$ past the lower end of the block $e$, thereby tilting the block from the wire $b$, and bringing it in contact with the wire $b'$, and shifting the circuit to the lower magnet $B^2$ $B^3$, which now attracts the armature D', and draws away the armature D from its magnet, at the same time pressing inward the lower end of the rocking arm $k$, and pulling the wheel $g$ back past the lower pivot of the block $e$, which is now tilted from the wire $b'$, and again restored to its contact with the wire $b$, again shifting the circuit. In this latter movement of the armature D, besides effecting this change of the circuit, it delivers a blow upon the end of the plugging-tool C, which protrudes from a bearing provided for it between the coils of the upper magnet, through which bearings it projects a suitable distance for receiving the impact blow of the armature. To compensate for the duty thus devolved upon the armature D, and to make its blow more effective, I place a spring, E, between the armature D' and its magnet, which, by its resilience, will, when the circuit is shifted from the upper to the lower magnet, materially assist the lower magnet, inasmuch as the power accumulated in the spring E by its contacts with the armature D' is thus transmitted to the armature D, and expended upon the plugger. The plugger-bar C is held in position by a spring-catch, G, which admits of the plugger being readily removed by simply lifting the catch. A plugger-bar of the usual form may be used in this instrument by simply forming a groove around it near one end to receive the end of the spring-catch G.

Some of the devices herein shown and described are claimed in other applications of mine filed simultaneously herewith, and are not therefore claimed herein.

I claim—

1. The combination, substantially as set forth, of the duplex electro-magnet, the oscillating armatures, the plugging-tool, and the circuit-changing mechanism.

2. The combination, substantially as set forth, of the oscillating armatures, the rocking arm K, carrying the wheel $g$, and the circuit-breaker block, with the magnet.

3. The c mbination of the magnet, its frame, the bearings, the tool movable endwise therein, and the spring-catch which holds the tool and oscillating armature, substantially as and for the purpose described.

In testimony whereof I have hereunto subscribed my name.

GEORGE F. GREEN.

Witnesses:
 LEVI TEEL,
 WM. E. MORGAN.